(12) United States Patent
Hu et al.

(10) Patent No.: US 7,601,704 B2
(45) Date of Patent: Oct. 13, 2009

(54) PROCESS FOR SYNTHESIZING OIL AND SURFACTANT-FREE HYALURONIC ACID NANOPARTICLES AND MICROPARTICLES

(75) Inventors: Zhibing Hu, Denton, TX (US); Xiaohu Xia, Denton, TX (US); Liping Tang, Arlington, TX (US)

(73) Assignee: University of North Texas, Denton, TX (US)

( * ) Notice: Subject to any disclaimer, the term of this patent is extended or adjusted under 35 U.S.C. 154(b) by 442 days.

(21) Appl. No.: 10/980,125

(22) Filed: Nov. 3, 2004

(65) Prior Publication Data

US 2006/0040892 A1    Feb. 23, 2006

Related U.S. Application Data

(60) Provisional application No. 60/516,707, filed on Nov. 3, 2003.

(51) Int. Cl.
*A61K 31/728* (2006.01)
*C08B 37/00* (2006.01)

(52) U.S. Cl. .......................................... 514/54; 536/53
(58) Field of Classification Search ................... 514/54; 536/53

See application file for complete search history.

(56) References Cited

U.S. PATENT DOCUMENTS 5,616,568 A * 4/1997 Pouyani et al. ............... 514/54
6,221,397 B1 * 4/2001 Russell-Jones et al. ...... 424/486

OTHER PUBLICATIONS

Ikada, Y. et al, Journal of Polymer Science: Part A: Polymer Chemistry, 1997, 35, 3553-3559.*

* cited by examiner

*Primary Examiner*—Shaojia Anna Jiang
*Assistant Examiner*—Ganapathy Krishnan
(74) *Attorney, Agent, or Firm*—Jackson Walker L.L.P.

(57) ABSTRACT

A method for synthesizing uniformly sized hyaluronic acid ("HA") particles that are substantially free from oil and surfactant contaminants. The method comprises crosslinking HA chains with 1-ethyl-3-(3-dimethlyaminopropyl) carbodiimide hydrochloride ("EDAC") and adipic acid dihydrazide in a water/acetone mixture.

34 Claims, 6 Drawing Sheets

PROCESS FOR SYNTHESIZING OIL AND SURFACTANT-FREE HYALURONIC ACID NANOPARTICLES AND MICROPARTICLES

CROSS-REFERENCE TO RELATED APPLICATIONS

This application claims priority to a U.S. Provisional Patent Application filed Nov. 3, 2003, Ser. No. 60/516,707, entitled "IMPROVED PROCESS AND APPARATUS FOR SYNTHESIZING OF SURFACTANT-FREE HYALURONIC ACID NANOPARTICLES AND MICROPARTICLES," with Hu et al., listed as inventors, the entire content of which is hereby incorporated by reference.

BACKGROUND

The present invention comprises a process and technique for synthesizing uniformed sized hyaluronic acid ("HA") particles that are free from oil and surfactant contaminants and useful for a variety of medical and industrial applications.

Hyaluronan (hyaluronic acid; HA), [-b-sodium glucuronic acid-(103)-b-N-acetyl glucosamine-(1®4)-]n, is a polysaccharide made up of repeating disaccharide units of sodium glucuronate and N-acetyl glucosamine linked by b 1-3 and b 1-4 glycosidic bonds. [1] Hyaluronic acid is a known, naturally occurring material, which has many applications in medicine and biology. See, for example, E. A. Balazs U.S. Pat. No. 4,272,522 and publications cited. The isolation and characterization of HA is described by Meyer et al, *J. Biol. Chem.* 107, 629 (1934); *J. Biol. Chem.* 114, 689 (1936); Balazs, *Fed. Proc.* 17, 1086 (1958); Laurent et al; *Biochim. Biophys. Acta* 42, 476 (1960). The structure of HA was elucidated by Weissman et al, *J. Am. Chem. Soc.* 76, 1753 (1954) and Meyer, *Fed. Proc.* 17, 1075 (1958). It should be noted that HA has been used widely used as medical implants for treating different pathological conditions such as eye surgery, osteoarthritis, wound repair and plastic surgery. [2] The highest concentration of HA is found in the soft connective tissue where it is a major component of the extra-cellular matrix, and in the vitreous body of the eye. This jelly-like complex is necessary for transportation of essential nutrients from the bloodstream, via the capillary network, to the living cells of the skin. HA products have been commercialized and widely reported for decades due to their great significance to human body.

The fabrication and applications of the crosslinked HA gel have been reported previously. For example, U.S. Pat. No. 4,636,542 ("the '542 patent") issued to Hefner, Jr., et al., on Jan. 13, 1987, entitled "Imide Functional Polyphenols; Thermosettable Compositions Containing Same and Cured Products Therefrom," describes imide functional polyphenols that are prepared by reacting an excess of a phenol with an unsaturated diimide which is prepared by reacting an unsaturated polycycloaliphatic dicarboxylic acid anhydride with a diamine. These materials are useful in the preparation of castings, coatings, laminates and the like.

U.S. Pat. No. 4,500,676 ("the '676 patent") issued to Balazs, et al., on Feb. 19, 1985, entitled "Hyaluronate Modified Polymeric Articles;" and U.S. Pat. No. 4,487,865 ("the '865 patent") issued to Balazs, et al., on Dec. 11, 1984, entitled "Polymeric Articles Modified with Hyaluronate;" describe polymeric materials (and articles made therefrom) including polyurethanes, polyesters, polyolefins, polyamides, polysiloxanes, vinylic and acrylic polymers are rendered biocompatible by including with the polymeric material hyaluronic acid or a salt thereof. The hyaluronic acid may be coated onto the surface of the polymeric material, dispersed throughout the body of the polymeric material, or both. The hyaluronic acid on the surface of the polymeric material may optionally be cross-linked. The biocompatible polymeric materials are used in the making of various prosthetic devices including heart valves, intraocular lenses, vascular grafts, pacemaker leads and the like.

U.S. Pat. No. 4,303,676 ("the '4,303,676 patent") issued to Balazs on Dec. 1, 1981, entitled "Hyaluronate Based Compositions and Cosmetic Formulations Containing Same," describes a water based, viscoelastic composition for use in cosmetic formulations comprising, (a) a mixture of sodium hyalfractions having different molecular weights, (b) protein which is derived from the natural material from which the hyaluronate is obtained, and (c) water. Also disclosed are cosmetic formulations comprising about 0.05-5.0% of the above composition together with an emollient, a sugar alcohol, a neutral or anionic polysaccharide, a preservative, bacteriostatic and fungistatic substance which does not react with or degrade hyaluronic acid, and water.

U.S. Pat. No. 4,141,976 ("the '976 patent") issued to Voorhees on Feb. 27, 1979, entitled "Process for alleviating proliferative skin diseases," describes a process for alleviating proliferative skin diseases such as psoriasis, atopic dermatitis, etc. comprising administering to humans, or domesticated animals, topically and/or systemically a composition comprising a pharmaceutical carrier and at least one active compound selected from the groups, substituted alkyl zanthines, substituted thioxanthines, alone or in combination with a glucocorticoid.

U.S. Pat. No. 3,357,784 ("the '784 patent") issued to Kasper, et al., on Dec. 12, 1967, entitled "Exposure to Intense Ultraviolet light to Improve Characteristics of Cellulose Fabrics in Divinyl Sulfone and Glyoxal Cross-linking Processes," describes an advance of treating cellulosic materials with certain unsaturated non-resin forming reactants, whereby enhanced and unexpected stabilization is attained without excessive strength loss.

The entire content of each of: the '542 patent; the '676 patent; the '865 patent; the '4,303,676 patent; the '976 patent; and the '784 patent is hereby incorporated by reference. Generally each of these references describe the formulation and applications of the cross-linking of bulk HA and derivatives with the use of 1,2,3,4-diepoxybutane in alkaline medium at 50° C. (T. C. Laurent, K. Hellsing, and B. Gelotte, Acta Chem. Scand. 18 [1984], No. 1, 274-5). The products obtained by this method are a gel, which substantially swells in water. Divinyl sulfone ("DVS") has been used previously for cross-linking polysaccharides, especially cellulose, as described in the '784 patent.

Micron-scale HA spheres have been synthesized using conventional water-in-oil emulsion process, spray drying and solvent evaporation. [13] However, it has been difficult to completely remove the oil and surfactant from the HA spheres, and the size and distribution of the HA particles fabricated by spray drying could be hardly controlled as well. The residue of oil and surfactant which are generally prohibited for medical treatment, together with the wide particle size distribution, essentially limited the application of HA as a nano-biomaterial for drug loading, nano-encapsulation and hydrogel architecture designs, such as the fabrication of nanoparticle networks as a drug carrier with two levels hierarchies. Equally important, none of the existing technique can produce monodisperse nanoparticles. Therefore, processes producing uniformed sized HA nanoparticle synthesis without the use of oil and surfactant are highly desirable.

The present invention describes a technique that turns HA into nanometer scaled particulates. Although not wanting to be bound by theory, these nanometer scaled particulates can be used in a variety of medical and industrial applications, including drug delivery vehicles, tissue expander, or tissue engineering scaffolds, whereby creating new medical and industrial applications using state of the art nanotechnology processes and apparatus possible. Additionally, the HA nanoparticles of this invention may be useful to produce drug release device and tissue engineering scaffolds.

It is well recognized that small particle size (on the nanoscale) is useful for carrier-mediated treatment of pathologies that require systemic administration and long-term circulation. The invention of the narrowly distributed surfactant free HA nanoparticle will open a door for the existing commercially available but healthcare-only oriented HA products to the nano-biomaterial for practical medical treatment.

SUMMARY

One aspect of the present invention pertains to a method for synthesizing uniformly sized hyaluronic acid ("HA") particles that are substantially free from oil and surfactant contaminants. These HA particles may be useful for a variety of medical and industrial applications.

One aspect of the current invention comprises a method for synthesizing hyaluronic acid ("HA") particles by crosslinking HA chains with 1-ethyl-3-(3-dimethlyaminopropyl) carbodiimide hydrochloride ("EDAC") and adipic acid dihydrazide in a water/acetone mixture. The method also comprises isolating the synthesized HA particles from the non-crosslinked EDAC and the non-crosslinked adipic acid dihydrazide or the acetone, wherein a preferred embodiment of the isolation procedure comprises dialyzing the synthesized HA particles against de-ionized water for about 3 weeks, with frequent changes of water, using a dialysis membrane that allows free diffusion of molecules having a size less than 13,000 Daltons.

In a first preferred embodiment, the water/acetone mixture used in the method comprises a weight ratio range of about 80:200 to about 80:300. The HA chains used in a preferred embodiment have a concentration in a range of about 0.05% wt/volume to about 0.15% wt/volume in the water/acetone mixture, and the preferred amount of EDAC comprises a weight ratio of EDAC:adipic acid dihydrazide of about 2:1. In a second preferred embodiment, the EDAC has a concentration of about $2.7 \times 10^{-4}$ g/g in the water/acetone mixture, and the adipic acid dihydrazide has a concentration in of about $1.35 \times 10^{-4}$ g/g in the water/acetone mixture. The crosslinking occurs at a preferred temperature in the range of about 21° C. to about 30° C., and the crosslinking occurs at in a preferred time range of about 29 hours to about 50 hours. Synthesized HA particles are substantially free from oil and surfactant contaminants and have a uniform size of about 200 nanometers when the crosslinking reaction is completed in a time range of about 44 hours.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

The conventional methods to produce HA particles have two major drawbacks:
 (1) Most of these methods require the use of oil and surfactants, which are very difficult to removed from the resultant products; and
 (2) None of the previously described methods can produce mono-disperse nanoparticles (i.e. particles with uniform and narrow range of diameters).

The technique describe herein produces mono-disperse nanoparticles without the use of oil or surfactants, and thus, the product is substantially free of oil.

Figure 4:
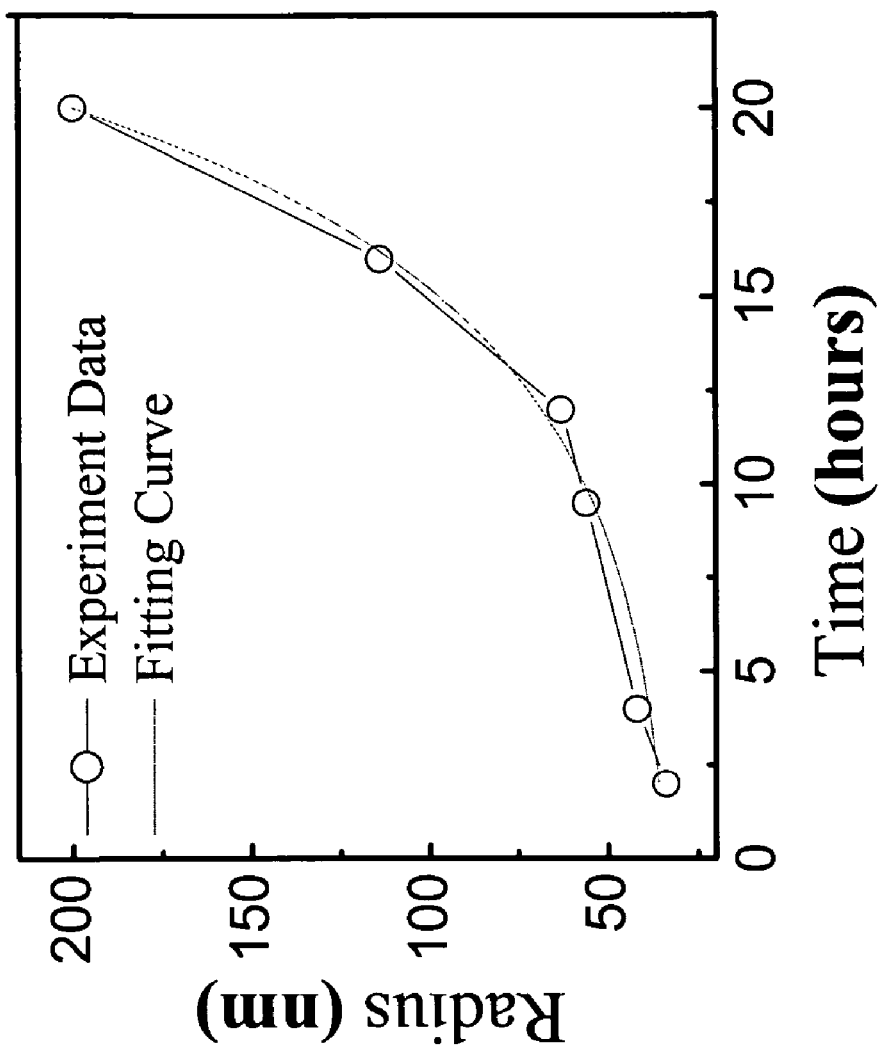
FIG. 4 is the HA particle size change as a function of the reaction time at 21° C.

The present invention comprises a process and technique for synthesizing uniform sized HA nanoparticles and microparticles. Specifically, hyaluronic acid chains are crosslinked by 1-ethyl-3-(3-dimethlyaminopropyl) carbodiimide hydrochloride ("EDAC") and adipic acid dihydrazide in the medium of water/acetone mixture. Although not wanting to be bound by theory, in this mixture, HA chains tend to self-associate due to the poor solvent environment. Advantageously, the resultant HA nanoparticle or microparticle size and distribution can be controlled by a variety of parameters such as polymer concentration, water/acetone ratio, reaction temperature and duration. For example, the particle hydrodynamic radius change as a function of the reaction time at 21° C. was measured by dynamic light scattering and shown in FIG. 4.

EXAMPLES

The following examples are provided to further illustrate this invention and the manner in which it may be carried out. It will be understood, however, that the specific details given in the examples have been chosen for purposes of illustration only and not be construed as limiting the invention.

Materials used for HA synthesis: Recombinant HA, which is chemically identical to purified HA from animal tissues, were used in this study. Hyaluronan 200 KD and 1500 KD were purchased from Lifecore Biomedical (Chaska, Minn.) or Sigma Chemicals (St. Louis, Mo.) and used as received. 1-ethyl-3-(3-dimethlyaminopropyl) carbodiimide hydrochloride ("EDAC") and adipic acid dihydrazide were purchased from Aldrich Chemical Company and used as received. Acetone was purchased from EM Science. Water for all reactions, solution preparation, and polymer purification was distilled, purified to a resistance of 18.2 MΩ MILLIPORE systems, and filtered through a 0.22 μm filter to remove particulate matter.

Hyaluronic Acid Microgel Synthesis HA nanoparticles were synthesized in the media of water/acetone mixture solvents at about room temperature. First, 1.0 wt % HA aqueous solution was prepared as follows: 0.2 g HA powder was dispersed in a 20.0 g aqueous solution by gentle shaking for a week to ensure thorough dissolution. Eight (8) grams of such solution was then taken into a 500 ml flask and diluted 10 times with distilled water, 108 grams of acetone was added gently and stirred for 2 hours to make sure all the components in the solution were well dispersed. The flask was sealed with a rubber stopper to avoid acetone evaporation. 2 ml well dissolved aqueous solution of EDAC (0.08 gram) and adipic acid dihydrazide (0.04 gram) was then added into the flask, where the temperature was controlled at 21±1° C. using a water bath. 24 hours later, another 104 gram of acetone was added and the solution was kept stirred for further 20 hours. To collect the kinetic information of the reaction, 5 ml of aliquot solution was taken from the reaction container at the time of 2 hours, 4 hours, 9.5 hours 12 hours, 16 hours and 20 hours, respectively. The reaction was then stopped by dialysis of the whole solution against distilled water, so that the acetone and un-react EDAC and adipic acid dihydrazide were removed. The formed HA nanoparticles are quite stable in water without size changing for couple of weeks. Visual observation reveals that the solution was transparent for the first 24 hours, and turns to light blue 10 hours after the secondary acetone addition. Although not wanting to be bound by theory, EDAC and adipic acid dihydrazide function as crosslinking agents, and the proposed mechanism is given in FIG. 2. EDAC works as a catalyst to assist the crosslinking reaction between HA chains and adipic acid dihydrazide. EDAC and adipic acid dihydrazide are commonly used crosslinking reagents for carboxyl groups [CarbodiiGreg T. Hermanson, Bioconjugate Techniques, 1996 by Academic Press, San Diego, Calif.]. N-substituted carbodiimides of EDAC (b) can react with carboxylic acids on HA chains (a) to form highly reactive O-acylisourea derivatives (c) that are extremely short-lived. This active species then react with two ends primary amines of adipic acid dihyrazide (d), resulting in the neighboring HA chains being chemically crosslinked (e). The micron scale HA particle can be synthesized based on the same strategy, while allowing a longer reaction time (e.g. up to 25 hours) after the secondary acetone addition. The solution turned cloudy when the HA particle grown to the micron scale.

Figure 1:
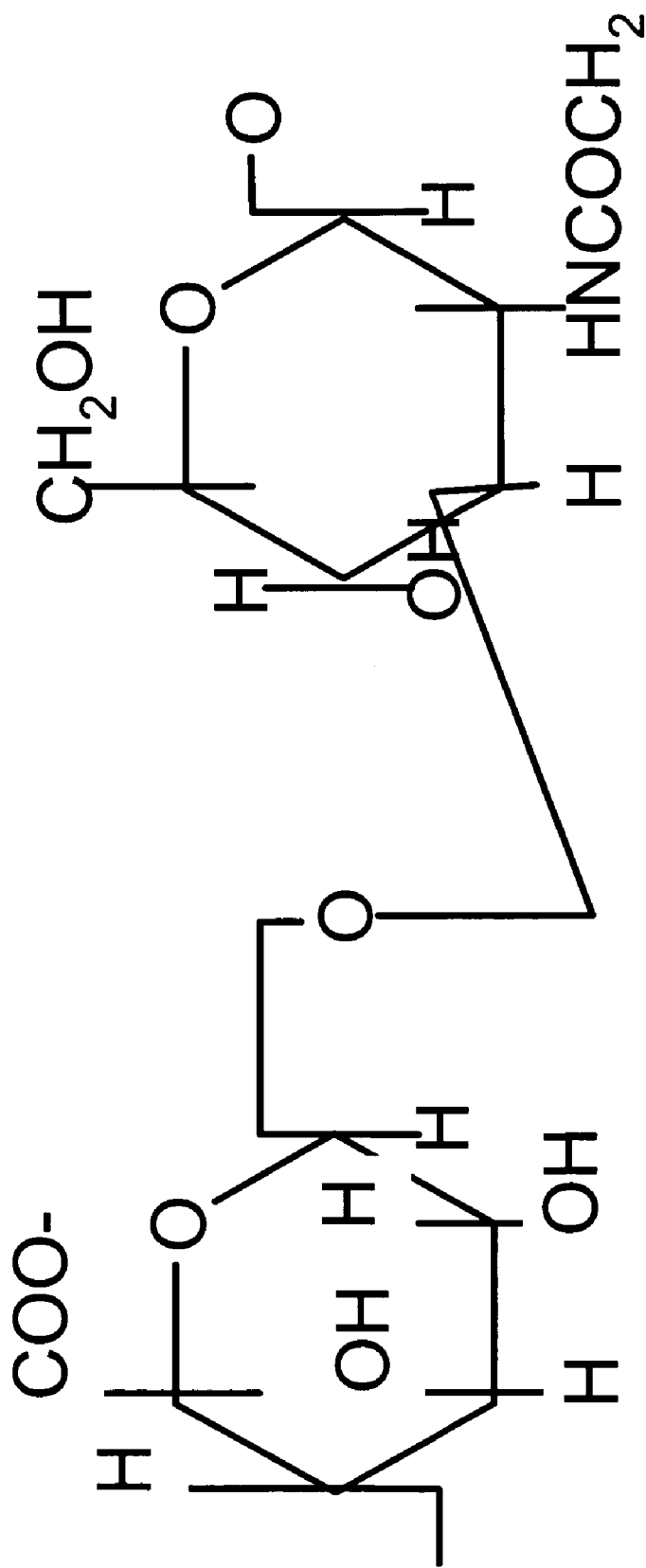
FIG. 1 shows a diagram of the chemical structure of hyaluronic acid.
Figure 2:
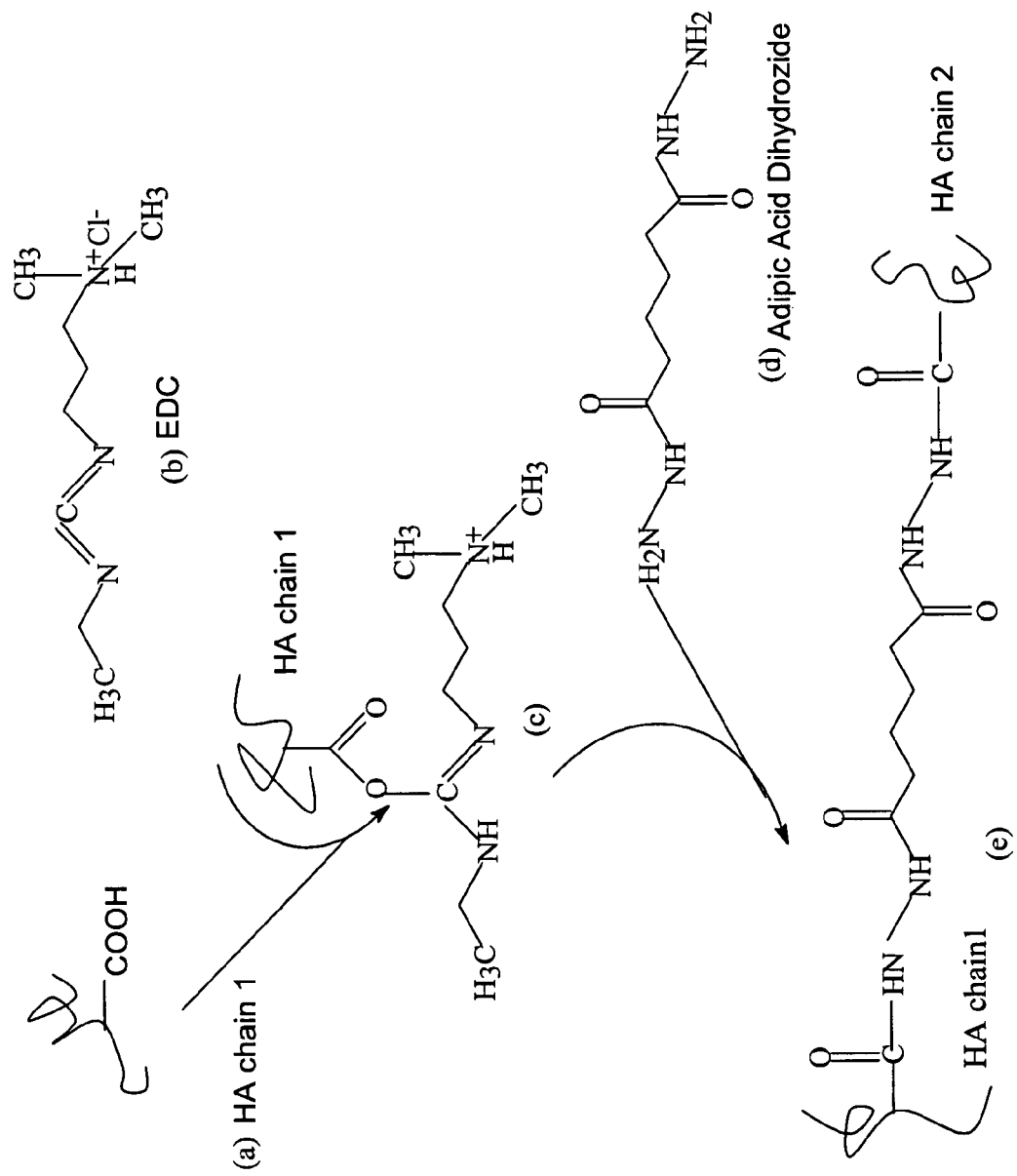
FIG. 2 illustrates a proposed mechanism between HA chains and crosslinking agents.

The acetone/water mixture initiates the crosslinking reaction. Actually, there are no nanoparticles formed in 48 hours after the first addition of acetone, as observed in a parallel control experiment. With the second addition of acetone, the weight ratio of acetone/water reached 212/80 that is sufficient to break the strong hydrogen bonding among HA chains and HA-water molecules to free their carboxyl groups for the crosslinking reaction. Following the consumption of the carboxyl groups by adipic acid dihydrazide, the crosslinked HA chains became less hydrophilic and transformed from coil to globule, leading the solution turns from clear to light blue— the sign indicating the nanoparticles formation. A rational acetone/water weight ratio range to form HA nanoparticle is between 200/80 to 300/80, where a higher ratio will lead to a faster particle growing kinetics. Since one adipic acid dihydrazide molecule consumes two HA repeating units as illustrated in FIGS. 1 and 2, the molar ratio of HA repeating units to adipic acid dihydrazide in the resultant nanoparticles is around: 2:1.

Characterization of HA Particles Using Static and Dynamic Light Scattering: A commercial laser light scattering (LLS) spectrometer (ALV/DLS/SLS-5000) equipped with an ALV-5000 digital time correlator was used with a Helium-Neon laser (Uniphase 1145P, output power of 22 mW and wavelength of 632.8 nm) as the light source. The incident light was vertically polarized with respect to the scattering plane and the light intensity was regulated with a beam attenuator (Newport M-925B). The scattered light was conducted through a very thin (~40 μm in diameter) optical fiber leading to an active quenched avalanche photo diode (APD), which serves as the detector. As a result, the coherent factor β in dynamic laser light scattering was about 0.98. The avalanche photo diode had a sensitivity two orders of magnitude higher than that of a normal photon multiplier (PM) tube, while its dark count increased no more than 10 times. Thus, a 22-mW laser could have a measured count rate similar to a 400 mW laser for a normal PM tube.

In static LLS, the angular dependence of the excess absolute time-averaged scattered intensity, known as the excess Rayleigh ratio $R_{vv}(q)$, was measured. For a dilute solution with a concentration C (g/mL), $R_{vv}(q)$ measured at a relatively small scattering angle θ can be written as [15]

$$\frac{KC}{R_{vv}(q)} \cong \frac{1}{M_w}\left(1 + \frac{1}{3}\langle R_g^2 \rangle_z q^2\right) + 2A_2 C \qquad (1)$$

where $K=4\pi n^2(dn/dC)^2/(N_A \lambda_0^4)$ and $q=(4\pi n/\lambda_0)\sin(\theta/2)$ with $N_A$, dn/dc, n, $\lambda_0$ being Avogadro's number, the specific refractive index increment, the solvent refractive index, and the wavelength of light in a vacuum, respectively; $M_w$ is the weight average molar mass; $A_2$ is the second-order virial coefficient; and $\langle R_g^2 \rangle_z^{1/2}$ is the root-mean-square z-average radius of gyration.

In dynamic LLS, the intensity-intensity time correlation function $G^{(2)}$ (t, q) in the self-beating mode was measured and can be expressed by [15]

$$G^{(2)}(t,q) = \langle I(t,q)I(q,0) \rangle = A(1+\beta|g^{(1)}(q,t)|^2) \qquad (2)$$

where t is the decay time, A is a measured baseline, β is the coherence factor, $g^{(1)}$(q, t) is the normalized first-order electric field time correlation function E(t, q) and is related to the line-width distribution G(Γ) by $$g^{(1)}(t,q) = \langle E(t,q)E^*(0,q) \rangle = \int_0^\infty G(\Gamma)e^{-\Gamma t}d\Gamma \qquad (3)$$

G(Γ) can be obtained from the Laplace inversion of $g^{(1)}$(q, t). $g^{(1)}$(q, t) was analyzed by a cumulant analysis to get the average line width <Γ> and the relative distribution width $\mu_2/\langle\Gamma\rangle^2$. The extrapolation of Γ/$q^2$ to q→0 led to the translational diffusion coefficient (D). Further, G(Γ) can be converted to the translational diffusion coefficient distribution G(D) and to the hydrodynamic radius distribution $f(R_h)$ by using the Stokes-Einstein equation $$R_h = \frac{k_B T}{6\pi\eta D} \qquad (4)$$

where $k_B$, T, η are the Boltzmann constant, the absolute temperature, and the solvent viscosity, respectively. The dynamic light scattering experiments were performed at the scattering angle θ=30°. Using a smaller scattering angle could make the measurements more accurate, but it will not significantly affect the trends of the results. Most of the HA microparticles are distributed in the range of 5 to 10 micron in diameter, observed by optical microscopy.

Figure 3:
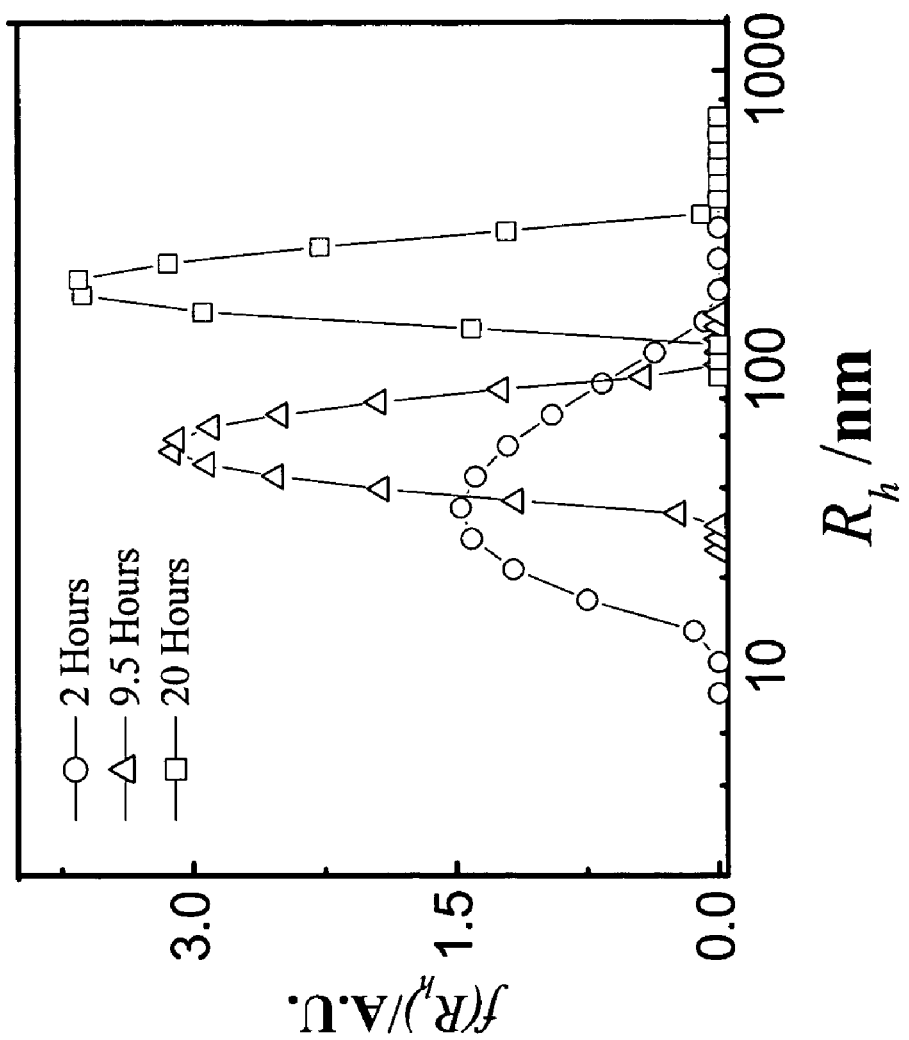
FIG. 3 shows the hydrodynamic radius distributions ($f(R_h)$) of HA microgel particles (C=$3.0 \times 10^{-6}$ g/ml) in deionized water at 296.4K, measured by dynamic light scattering at the angle of 30 degree.
Figure 5:
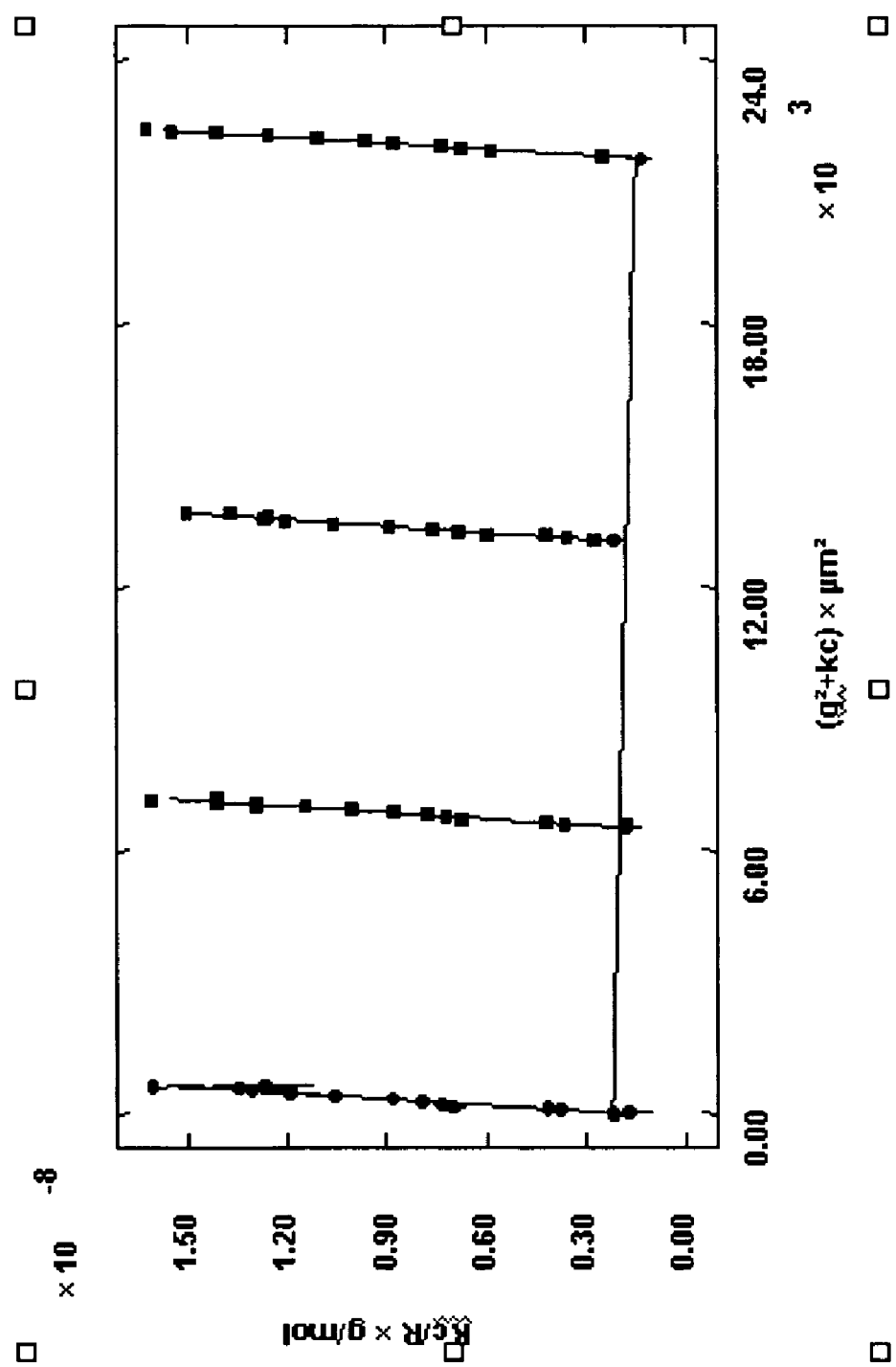
FIG. 5 shows the Zimm plot for HA nanoparticles, measured by static light scattering. HA were diluted to $1 \times 10^{-5}$, $6 \times 10^{-6}$, and $3 \times 10^{-6}$ g/ml stepwisely and extrapolated to zero concentration.
Figure 6:
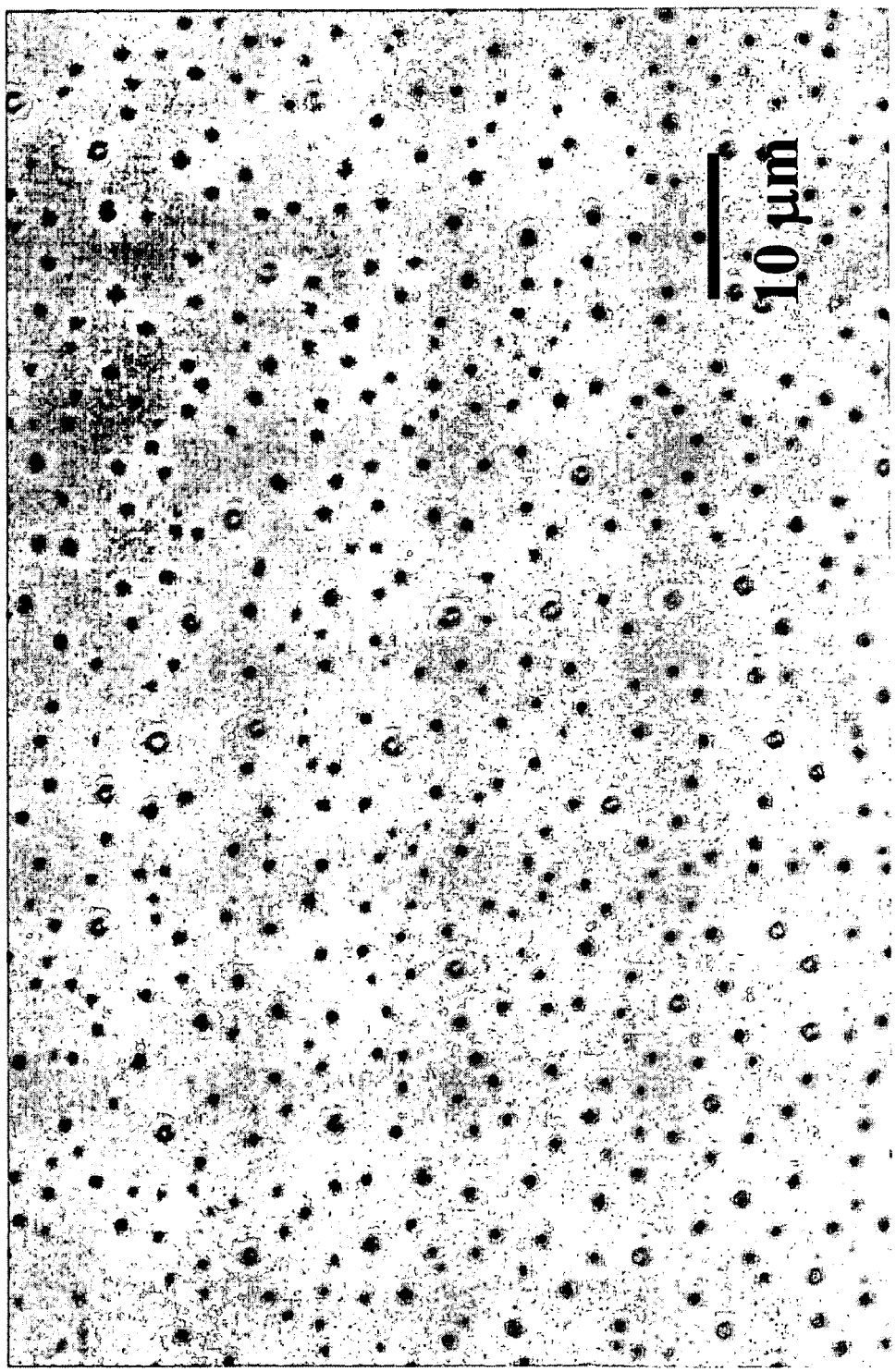
FIG. 6 shows the image of the micro-scale HA particles, observed by optical microscope.

Characterization of HA nanoparticles with light scattering. Hydrodynamic radius ($R_h$) distributions of the synthesized HA nanoparticles in water is shown in FIG. 3, measured by dynamic light scattering at 21° C. The main $R_h$ peak of HA nanoparticles are at 34 nm, 56 nm and 197 nm for the particles reacted for 2 hours, 9.5 hours and 20 hours. The particles resulted from 20 hours reaction has a narrow size distribution revealed by the small value of the Sigma of 0.29, Sigma is referred as $$\frac{FWHM}{\sqrt{-2 \times \ln\left(\frac{1}{2}\right)}},$$

where FWHM stands for the fall width half maximum of the peak profile. A narrow distribution indicates that this is a self-associating process, in contrast to simply packing individual molecules that usually leads to aggregates with a broad size distribution. The HA particle growing kinetics was studied as a function of reaction time and shown in FIG. 4, the experimental data of the Rh could be well represented by $Rh=30+4.1e^{t/\tau}$, where the character time $\tau$ is about 5.5 hours. To find more information about individual HA nanoparticles, static light scattering was carried out for the polymer in water. FIG. 5 shows the Zimm plot of the polymer in water at 21° C. The value of dn/dc used here is 0.0713 ml/g as measured by a refractometer (Dawn DSP, Wyatt Technology Corporation) at 21° C. From the extrapolation of $KC/R_{vv}(q)$ in Eq. 1 to the zero angle and zero concentration, the molar mass $M_w$, the second virial coefficient $A_2$, and the radius of gyration $<R_g>$ were determined to be $4.545 \times 10^8$ g/mol, $-3.476 \times 10^{-5}$ mol*cm³/g², and 167 nm, respectively. By combining DLS and SLS results, the ratio of $<R_g>/<R_h>$ was found to be 0.84. This value is pretty close to the theoretical value of $(3/5)^{1/2}$ for uniform hard spheres. The density of HA ($\rho$) in water may be estimated according to the relation $4/3 * \pi R^3 \rho = M_w/N_A$, where R is $R_h$ from DLS, the molar mass, M, is $M_w$ from SLS, and $N_A$ is Avogadro's number. Thus the calculated average polymer density in each polymer sphere is about $2.359 \times 10^{-2}$ g/cm³ at 21° C. in water. It is noted that the density ($\rho$) obtained here is only an approximate value due to non-uniform distribution of polymer within an individual polymer.

This process of the present invention is an improvement over conventional processes because the synthesized HA particle is substantially oil and surfactant free and the HA particle size is narrowly distributed.

Although not wanting to be bound by theory, the HA product resultant from the improved process is useful in the following applications:

1) The HA product can be used as a loading matrix for drug nanoencapsulation; and 2) The HA product can be used as building blocks to fabricate nanoparticle networks.

Micron-scale HA spheres have been synthesized using conventional water-in-oil emulsion process. It is nevertheless difficult to remove substantially all of the oil and surfactant. With the innovative and improved process presented herein, synthesis of narrowly distributed oil and surfactant free HA nanoparticles and microparticles can be realized on a consistent basis. Depending on the various procedures and affiliations between HA and different surfactants, the weight ratio of surfactant residue to HA may ranging from zero to 10%, the completely removal of the surfactant however is very difficult if not impossible.

The reaction process of the present invention can be implemented in a conventional flask at room temperature with conventionally available reagents. Advantages of the present invention include high conversion efficiency with the resultant nanoparticle or microparticles having narrow size distribution. The results of present invention are an improvement over the conventional water-in-oil process, as the present invention provides HA particles that are substantially surfactant and oil-free.

The innovative teachings of the present invention are described with particular reference to the improved process for synthesizing of hyaluronic acid ("HA") nanoparticles and microparticles and apparatus' that implement same, and the applications derived therefrom. It should be understood and appreciated by those skilled in the art that the arrangements, uses, and embodiments described herein provide only a few examples of the many advantageous uses and innovative teachings herein. Various alterations, modifications and substitutions can be made to the improved process of the disclosed invention and the apparatus' that implement the present invention without departing in any way from the spirit and scope of the invention.

TABLE 1

LLS characterization results of HA Microgel.

| $R_h$(nm) | $R_g$(nm) | $R_g/R_h$(a.u.) | Sigma | dn/dc (ml/g) | $A_2$(mol*cm³/g²) | Mw (g/mol) | Density(g/cm³) |
|---|---|---|---|---|---|---|---|
| 197 | 167 | 0.84 | 0.29 | 0.0713 | $-3.476 \times 10^{-5}$ | $4.545 \times 10^8$ | $2.359 \times 10^{-2}$ |

This table shows the single HA nanoparticle's properties, combined both dynamic and static light scattering.

Table 1 shows the single HA nanoparticle's properties, combined both dynamic and static light scattering.

While the compositions and methods of this invention have described in terms of preferred embodiments, it will be apparent to those of skill in the art that variations may be applied to the composition, methods, periods of time, and in the steps or in the sequence of steps of the method described herein without departing from the concept, spirit and scope of the invention. More specifically, it will be apparent that certain agents that are both chemically and physiologically related might be substituted for the agents described herein while the same or similar results would be achieved. An industrial scaling of the methods disclosed herein are understood to be within the spirit and scope of the invention. All such similar substitutes and modifications to those skilled in the art are deemed to be within the spirit, scope and concept of the invention as defined by the appended claims.

REFERENCES CITED

The following references, to the extent that they provide exemplary procedural or other details supplementary to those set forth herein, are specifically incorporated herein by reference.

U.S. PATENT DOCUMENTS

U.S. Pat. No. 4,636,542 ("the '542 patent") issued to Hefner, Jr., et al., on Jan. 13, 1987, entitled "Imide Functional Polyphenols; Thermosettable Compositions Containing Same and Cured Products Therefrom."

U.S. Pat. No. 4,500,676 ("the '676 patent") issued to Balazs, et al., on Feb. 19, 1985, entitled "Hyaluronate Modified Polymeric Articles;"

U.S. Pat. No. 4,487,865 ("the '865 patent") issued to Balazs, et al., on Dec. 11, 1984, entitled "Polymeric Articles Modified with Hyaluronate."

U.S. Pat. No. 4,303,676 ("the '4,303,676 patent") issued to Balazs on Dec. 1, 1981, entitled "Hyaluronate Based Compositions and Cosmetic Formulations Containing Same."

U.S. Pat. No. 4,141,976 ("the '976 patent") issued to Voorhees on Feb. 27, 1979, entitled "Process for Alleviating Proliferative Skin Diseases."

U.S. Pat. No. 3,357,784 ("the '784 patent") issued to Kasper, et al., on Dec. 12, 1967, entitled "Exposure to Intense Ultraviolet light to Improve Characteristics of Cellulosic Fabrics in Divinyl Sulfone and Glyoxal Cross-linking Processes."

REFERENCES

[1] Peattie R A, Nayate A P, Firpo M A, Shelby J, Fisher R J, Prestwich G D. Stimulation of in vivo angiogenesis by cytokine-loaded hyaluronic acid hydrogel implants. Biomaterials (in press), 2004.

[2] Avitabile T, Marano F, Castiglione F, Bucolo C, Cro M, Ambrosio L, Ferrauto C, Reibaldi A. Biocompatibility and biodegradation of intravitreal hyaluronan impalnts in rabbits. Biomaterials, 22: 195-2000, 2001.

[3] A. Rastrelli, M. Beccaro, F. Biviano, G. Calderini and A. Pastorello, Hyaluronic acid esters, a new class of semisynthetic biopolymers: chemical and physico-chemical properties. In: G. Heimke, U. Soltesz and A. J. C. Lee Editors, *Clinical Implant Materials* Elsevier, Amsterdam (1990), pp. 199-200.

[4] T. C. Laurent, U. B. G. Laurent and J. R. E. Fraser, Functions of hyaluronan. Ann. Rheum. Dis. 54 (1995), pp. 429-432.

[5] J. R. E. Fraser, T. C. Laurent and U. B. G. Laurent, Hyaluronan: its nature, distribution, functions and turnover. *J. Intern. Med.* 242 (1997), pp. 27-33.

[6] G. P. Dowthwaite, J. C. W. Edwards and A. A. Pitsillides, An essential role for the interaction between hyaluronan and hyaluronan binding proteins during joint development. *J. Histochem. Cytochem.* 46 (1998), pp. 641-651.

[7] C. Hardwick, K. Hoare, R. Owens, H. P. Hohn, M. Hook, D. Moore et al., Molecular cloning of a novel hyaluronan receptor that mediates tumor cell motility. *J. Cell Biol.* 117 (1992), pp. 1343-1350.

[8] L. Collis, C. Hall, L. Lange, M. R. Ziebell, G. D. Prestwich, E. A. Turley et al., Rapid hyaluronan uptake is associated with enhanced motility: implications for an intracellular mode of action. *FEBS Lett.* 440 (1998), pp. 444-449.

[9] W. F. Cheung, T. F. Cruz and E. A. Turley, Receptor for hyaluronan-mediated motility (RHAMM), a hyaladherin that regulates cell responses to growth factors. *Biochem. Soc. Trans.* 27 (1999), pp. 135-142.

[10] B. P. Toole, Hyaluronan in morphogenesis. *J. Intern. Med.* 242 (1997), pp. 35-40.

[11] B. Gerdin and R. Hallgren, Dynamic role of hyaluronan (HYA) in connective tissue activation and inflammation. *J. Intern. Med.* 242 (1997), pp. 49-55.

[12] L. M. Benedetti, E. M. Topp and V. J. Stella, Microspheres of hyaluronic acid esters-fabrication processes and in vitro hydrocortisone release. *J. Control. Release* 13 (1990), pp. 33-41.

[13] K. Kyyronen, L. Hume, L. M. Benedetti, A. Urtti, E. Topp and V. J. Stella, Methyleprednisolone esters of hyaluronic acid in ophthalmic drug delivery: in vitro and in vivo release studies. *Int. J. Pharm.* 80 (1992), pp. 161-169

[14] L. M. Benedetti, E. M. Topp and V. J. Stella, Microspheres of hyaluronic acid esters-fabrication processes and in vitro hydrocortisone release. *J. Control. Release* 13 (1990), pp. 33-41.

[15] Chu, B. *Laser Light Scattering*, 2nd ed.; Academic Press: New York, 1990.

What is claimed:

1. A method for synthesizing hyaluronic acid ("HA") particles comprising:
   crosslinking HA chains with adipic acid dihydrazide in a water/acetone mixture, using 1-ethyl-3-(3-dimethylaminopropyl) carbodiimide hydrochloride ("EDAC") as an activator;
   wherein the water/acetone mixture comprises a weight ratio of water:acetone in a range from about 80:200 to about 80:300; and
   wherein the concentration of the HA chains in the water/acetone mixture is in the range of about 0.05% wt/volume to about 0.15% wt/volume.

2. The method of claim 1, further comprising: isolating the synthesized HA particles from the water/acetone mixture.

3. The method of claim 2, wherein isolating comprises:
   (a) dialyzing the synthesized HA particles, using a dialysis membrane, against de-ionized water for about 3 weeks; and
   (b) changing the deionized water about every 10 hours;
      wherein dialyzing with the dialysis membrane allows free diffusion of molecules having a size less than 13,000 Dalton.

4. The method of claim 1, wherein the concentration of the HA chains in the water/acetone mixture is in the range of about 0.1% wt/volume.

5. The method of claim 1, wherein a ratio of EDAC adipic acid dihydrazide is in a weight ratio of about 2:1.

6. The method of claim 1, wherein the EDAC has a concentration of about $2.7 \times 10^{-4}$ g/g in the water/acetone mixture.

7. The method of claim 1, wherein the adipic acid dihydrazide has a concentration of about $1.35 \times 10^{-4}$ g/g in the water/acetone mixture.

8. The method of claim 1, wherein the crosslinking occurs at a temperature in the range of about 21° C. to about 30° C.

9. The method of claim 1, wherein the crosslinking occurs for a time of about 29 hours to about 50 hours.

10. The method of claim 9, wherein the synthesized HA particles have a uniform size of about 200 nanometers and the crosslinking time is in the range of about 44 hours.

11. The method of claim 1, wherein the synthesized HA particles are substantially free from oil and surfactant contaminants.

12. A method of synthesizing uniformly sized hyaluronic acid ("HA") particles substantially free from oil and surfactant contaminants, comprising:
   combining about 8 grams of an HA aqueous solution, about 80 grams of distilled water and about 108 grams of acetone into a covered container to give a mixture;

mixing the mixture of the covered container for a first period of time forming a HA/acetone mixture;

adding about 2 ml of an 1-ethyl-3-(3-dimethlyaminopropyl) carbodiimide hydrochloride ("EDAC") and adipic acid dihydrazide solution to the HA/acetone mixture forming an EDAC/adipic acid/HA/acetone mixture;

mixing the EDAC/adipic/HA/acetone mixture at a controlled temperature for a second period of time;

adding about 104 grams of acetone to the EDAC/adipic/HA/acetone mixture at a controlled temperature for a third period of time forming the uniformed sized HA particles; and isolating the uniformly sized HA particles.

13. The method of claim 12, wherein the HA aqueous solution comprises a 1% w/v solution prepared by dispersing about 0.2 g of HA powder in about 20.0 g of an aqueous solution and shaking the dispersion until the HA powder is dissolved.

14. The method of claim 12, wherein the first period of time comprises about 2 hours.

15. The method of claim 12, wherein the EDAC and adipic acid dihydrazide solution comprise about 0.08 grams of EDAC and about 0.04 grams of adipic acid dihydrazide.

16. The method of claim 12, wherein the controlled temperature comprises a temperature of from about 21° C. to about 30° C.

17. The method of claim 12, wherein the second period of time comprises about 24 hours.

18. The method of claim 12, wherein the third period of time comprises about 5 hours to about 25 hours.

19. The method of claim 12, wherein isolating the uniformly sized HA particles comprises:
(a) dialyzing the synthesized HA particles, using a dialysis membrane, against de-ionized water for about 3 weeks; and
(b) changing the deionized water about every 10 hours;
wherein dialyzing with the dialysis membrane allows free diffusion of molecules having a size less than 13,000 Dalton.

20. A uniformly sized hyaluronic acid ("HA") particle substantially free from oil and surfactant contaminants made by a method comprising: crosslinking HA chains with 1-ethyl-3-(3-dimethlyaminopropyl) carbodiimide hydrochloride ("EDAC") and with adipic acid dihydrazide in a water/acetone mixture;
wherein the water/acetone mixture has a weight ratio of water:acetone in a range from about 80:200 to about 80:300; and
wherein concentration of the HA chains in the water/acetone mixture is in the range of about 0.05% wt/volume to about 0.15% wt/volume.

21. The uniformly sized hyaluronic acid ("HA") particle of claim 20, wherein the method further comprises: isolating the synthesized HA particles from the water/acetone mixture.

22. The uniformly sized hyaluronic acid ("HA") particle of claim 21, wherein isolating comprises:
(a) dialyzing the synthesized HA particles against de-ionized water for about 3 weeks; and
(b) changing the deionized water about every 10 hours;
wherein dialyzing in a dialysis membrane allows free diffusion of molecules having a size less than 13,000 Dalton.

23. The uniformly sized hyaluronic acid ("HA") particle of claim 20, wherein the concentration of the HA chains in the water/acetone mixture is in the range of about 0.1% wt/volume in the water/acetone mixture.

24. The uniformly sized hyaluronic acid ("HA") particle of claim 22, wherein a ratio of EDAC:adipic acid dihydrazide is in a weight ratio of about 2:1.

25. The uniformly sized hyaluronic acid ("HA") particle of claim 22, wherein the EDAC has a concentration of about $2.7 \times 10^{-4}$ g/g in the water/acetone mixture.

26. The uniformly sized hyaluronic acid ("HA") particle of claim 22, wherein the adipic acid dihydrazide has a concentration in of about $1.35 \times 10^{-4}$ g/g in the water/acetone mixture.

27. The uniformly sized hyaluronic acid ("HA") particle of claim 22, wherein the crosslinking occurs at a temperature in the range of from about 21° C. to about 30° C.

28. The uniformly sized hyaluronic acid ("HA") particle of claim 22, wherein the crosslinking occurs for a time of from about 29 hours to about 50 hours.

29. The uniformly sized hyaluronic acid ("HA") particle of claim 28, wherein the synthesized HA particles has a uniform size of about 200 nanometers and the crosslinking time is in the time range of about 44 hours.

30. A method for synthesizing hyaluronic acid ("HA") particles comprising:
adding HA to water to form between a 0.05 to 0.5 wt % HA solution;
adding acetone to the HA solution in a weight ratio of approximately 100:70 to 100:80 to form an HA/water/acetone mixture;
stirring the HA/water/acetone mixture for approximately 2 hours;
adding EDAC to the HA/water/acetone mixture in a weight ratio of approximately 0.01:100 to 0.05:100 and adding adipic acid dihydrazide to the HA/water/acetone mixture in a weight ratio of approximately 0.01:100 to 0.05:100 to form a crosslinked mixture;
stirring the crosslinked mixture at approximately 20° C. to 22° C. for approximately 24 hours;
adding acetone in a weight ratio of approximately 50:100 to 60:100 to form a final mixture;
stirring the final mixture for approximately 20 hours; and
dialyzing the final mixture against distilled water to form HA particles.

31. The method of claim 30, wherein HA is added to water to form a 0.1 wt % HA solution.

32. The method of claim 30, wherein acetone is added to the HA solution at a ratio of approximately 108:80.

33. The method of claim 30 wherein EDAC is added to the HA/water/acetone mixture in a ratio of approximately 0.08:200 and adipic acid dihydrazide is added to the HA/water/acetone mixture in a ration of approximately 0.04:200.

34. The method of claim 30, wherein the acetone is added to the crosslinked mixture at a weight ratio of approximately 104:200.

* * * * *